United States Patent [19]

Balsells

[11] Patent Number: 4,907,788
[45] Date of Patent: Mar. 13, 1990

[54] DUAL CONCENTRIC CANTED-COIL SPRING APPARATUS

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 302,976

[22] Filed: Jan. 30, 1989

Related U.S. Application Data

[63] Continuation-in-part of Ser. No. 186,016, Apr. 25, 1988, and a continuation-in-part of Ser. No. 186,018, Apr. 25, 1988, Pat. No. 4,826,144, and a continuation-in-part of Ser. No. 186,017, Apr. 25, 1988, Pat. No. 4,830,344, and a continuation-in-part of Ser. No. 232,430, Aug. 15, 1988.

[51] Int. Cl.⁴ ........................... F16J 15/24; F16F 1/06
[52] U.S. Cl. ..................................... 267/168; 267/180; 267/1.5; 277/153; 277/205
[58] Field of Search ............... 267/166, 166.1, 167, 267/168, 169, 180, 1.5, 152, 160, 161; 277/153, 163, 164, 205, 235 R; 188/322.16, 322.17

[56] References Cited

U.S. PATENT DOCUMENTS

| | | | |
|---|---|---|---|
| 575,451 | 1/1897 | Yost | 267/168 X |
| 1,473,446 | 11/1923 | Scott | 277/163 |
| 1,867,723 | 7/1932 | Adams | 267/167 |
| 2,154,275 | 4/1939 | Linn | 248/358 |
| 2,610,846 | 9/1952 | Hanna | 267/1.5 |
| 2,638,896 | 5/1953 | Clark | 267/167 X |
| 2,859,033 | 11/1958 | Rose | 267/1.5 |
| 3,061,060 | 10/1962 | Stephenson | 192/41 |
| 3,183,010 | 5/1965 | Bram | 277/235 |
| 3,223,426 | 12/1965 | Reid | 277/153 |
| 3,223,785 | 6/1967 | Mather | 267/1.5 |
| 3,468,527 | 9/1969 | Mather | 267/1.5 |
| 4,094,280 | 6/1978 | Updike | 267/167 X |
| 4,509,473 | 4/1985 | Hamparian | 267/168 X |
| 4,655,462 | 4/1987 | Balsells | 277/164 |
| 4,718,868 | 1/1988 | Williams | 267/168 X |

*Primary Examiner*—Robert J. Oberleitner
*Attorney, Agent, or Firm*—Walter A. Hackler

[57] ABSTRACT

Annular coil spring apparatus is provided which includes a first annular spring with a plurality of coils canted along a centerline with a trailing portion of each coil and a leading portion of each coil defined by a back angle and front angle, respectively. Coils are interconnected in order to form a garter-type coil spring and a second annular spring is provided and disposed within the first annular spring. The second annular spring may include a plurality of coils canted along a centerline thereof and the first and second annular spring may be canted in either the same direction or opposite directions in order to provide different force-deflection characteristics of the annular coil spring apparatus.

32 Claims, 8 Drawing Sheets

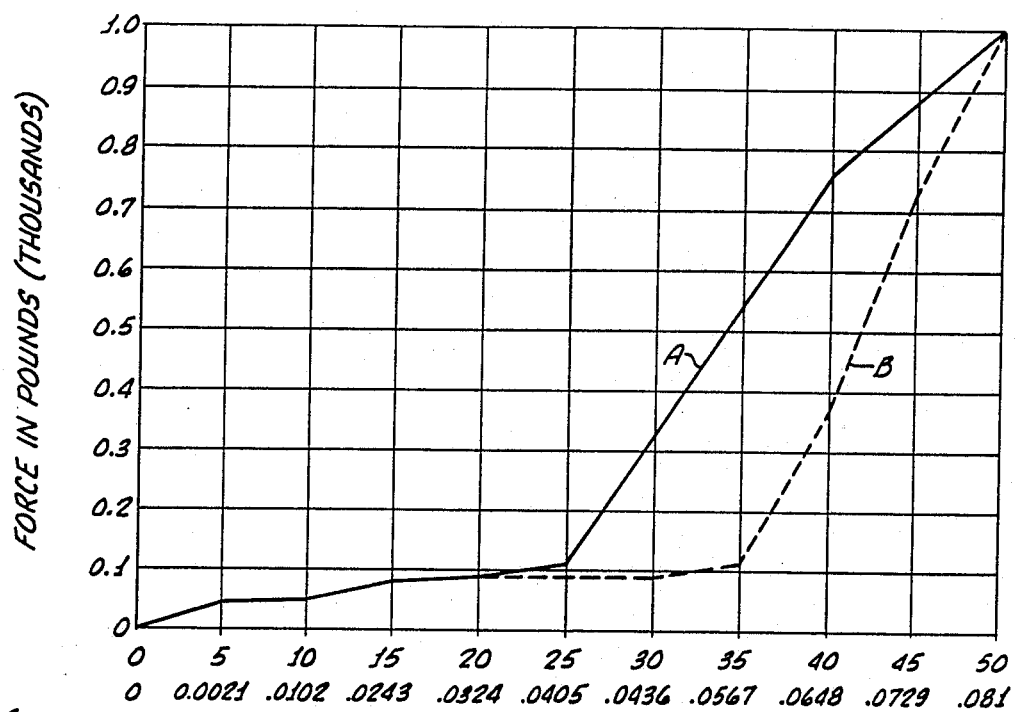
FIG. 4.   DEFLECTION IN PERCENT OF COIL HEIGHT
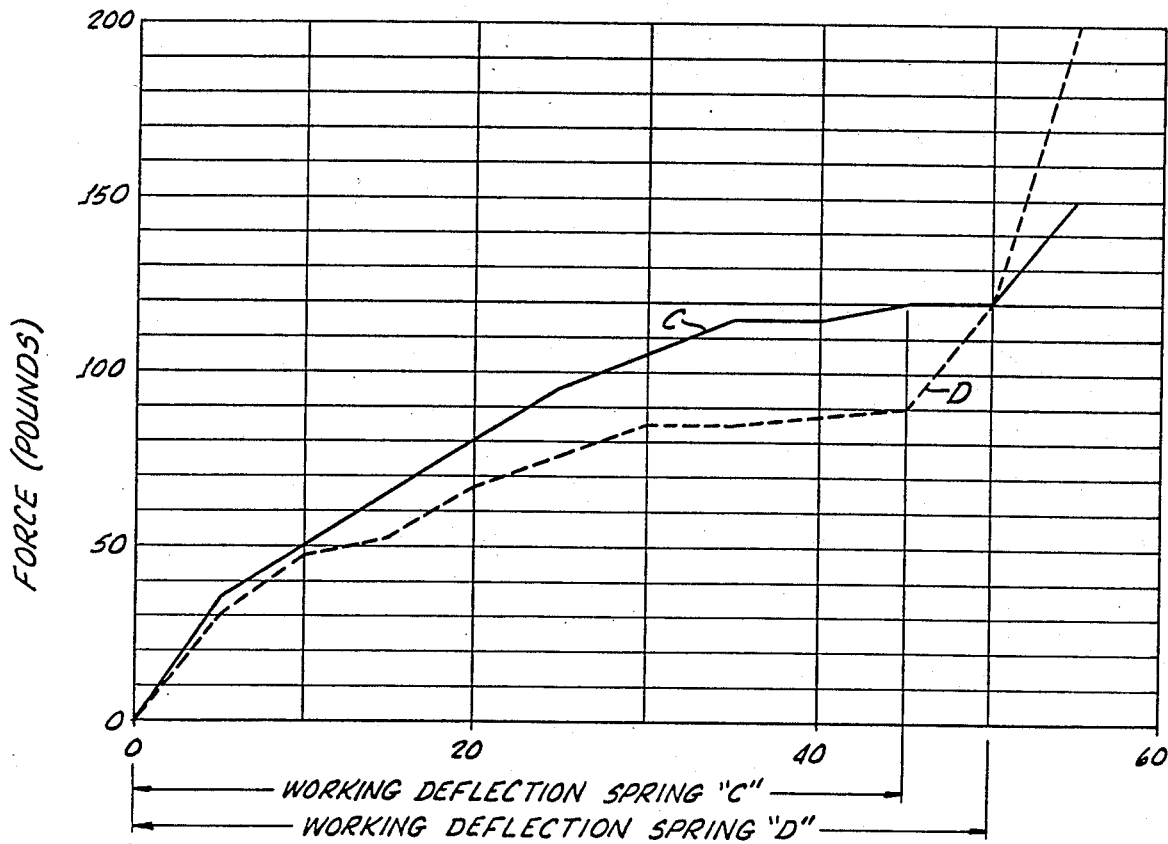
FIG. 5.   DEFLECTION (PERCENT)

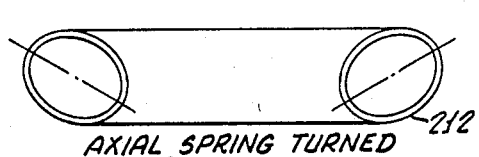
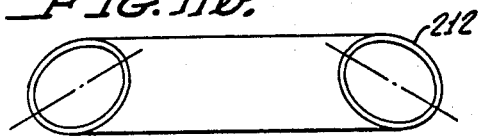
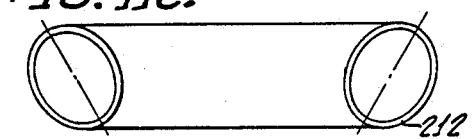
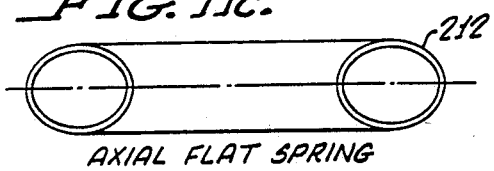
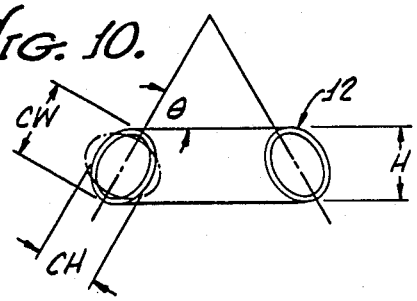
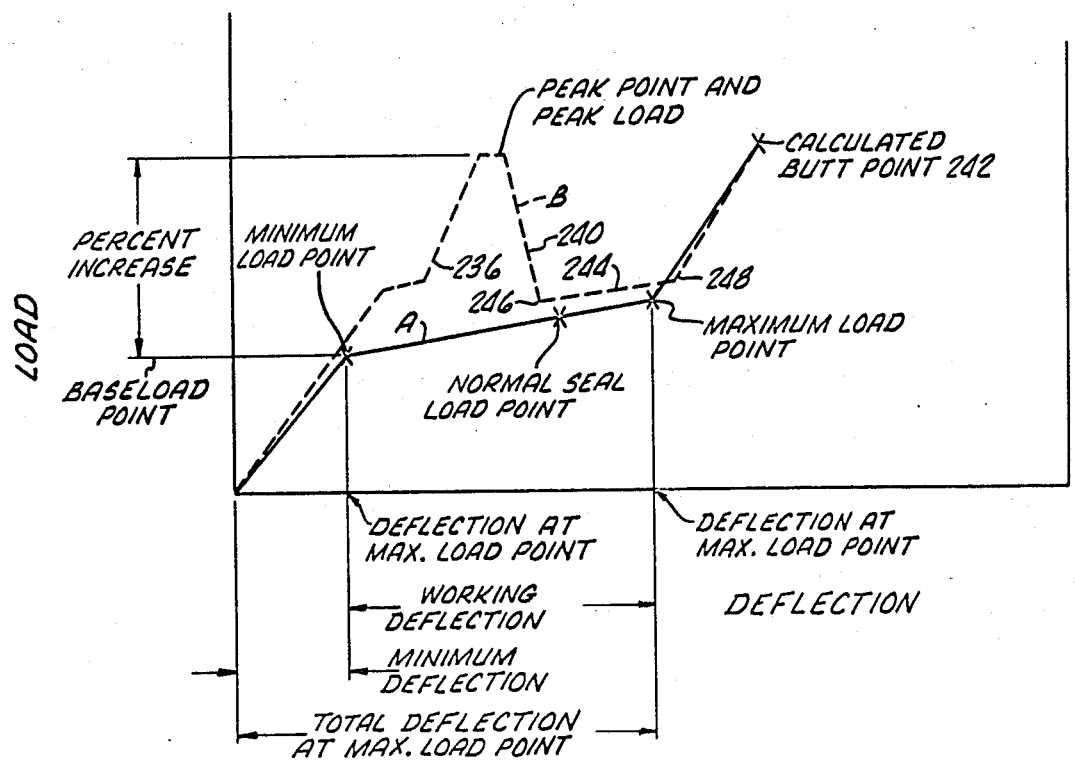

DUAL CONCENTRIC CANTED-COIL SPRING APPARATUS

The present invention is a continuation-in-part of U.S. application Ser. No. 186,016 filed Apr. 25, 1988, U.S. patent application Ser. No. 186,018 filed Apr. 25, 1988, now U.S. Pat. No. 4,826,144, issued May 2, 1989, U.S. patent application Ser. No. 186,017 filed Apr. 25, 1988, now U.S. Pat. No. 4,830,344, issued May 16, 1989, and U.S. patent application Ser. No. 232,430 filed Aug. 15, 1988.

The present application generally relates to canted coil springs and is more particularly directed to dual canted coil spring apparatus having two springs, one inside the other, with both springs being joined at the ends thereof. Both radial and axial canted coil springs have been in use for sometime and a general description of the characteristics thereof may be found in the hereinabove referenced copending U.S. patent applications which are herewith incorporated by specific reference thereto.

While the hereinabove referenced canted coil springs may be tailored to provide a great number of load-deflection characteristics, in some instances it is not possible to provide required load-deflection characteristics within an envelope dictated by other equipment requirements.

The present invention provides a spring capable of meeting load-deflection characteristics beyond that capable from heretofore as single canted coil springs.

SUMMARY OF THE INVENTION

In accordance with the present invention, annular coil spring apparatus includes a first annular spring having a plurality of coils canted along a centerline thereof, back angle means for both defining the disposition of a trailing portion of each coil with respect to a line normal to the centerline and for determining the force-deflection characteristics of the first annular spring. Front angle means are provided for defining the disposition of a leading portion of each coil with respect to the normal line with the front angle means being greater than the back angle means. The coils are interconnected in a manner forming a garter-type resilient coil spring and a second annular spring is provided which is disposed within the first annular spring. In this manner, additional load can be handled by the annular coil spring apparatus than hereinbefore attainable within the same envelope, or package requirements.

More particularly, the first and second annular springs may be configured for a radial or axial loading and further the centerline of the first and second annular springs may coincide and the first and second coils thereof may cant in opposite directions along the centerline thereof. It has been unexpectedly found when the coils of the first and second annular springs are canted in opposite directions, the total force generated is greater than the force developed when both springs cant in the same direction.

BRIEF DESCRIPTION OF THE DRAWINGS

The advantages and features of the present invention will appear from the following description when considered in conjunction with the accompanying drawings in which:

FIG. 4 is a load versus deflection curve for the springs shown in FIGS. 2 and 3;

FIG. 5 shows load deflection curves for a variety of axially loaded counterclockwise springs with the trailing portion along the outside diameter thereof corresponding to the spring dimensions set forth in Table 1;

FIG. 9 shows load deflection curves for springs made in accordance with the present invention.

FIG. 10 is a schematic of an axially canted coil spring with turn angle $\theta$ shown for the purpose of illustrating how the turn angle $\theta$ may be calculated;

FIGS. 11a, b, c and e illustrate axial springs having various turn angles;

DETAILED DESCRIPTION

In order to more clearly describe the present invention, a description will first be given directed to single coil springs, both radial and axial, which may be used in the present invention in conjunction with a coaxial inner spring of the same or different type.

Figure 1:
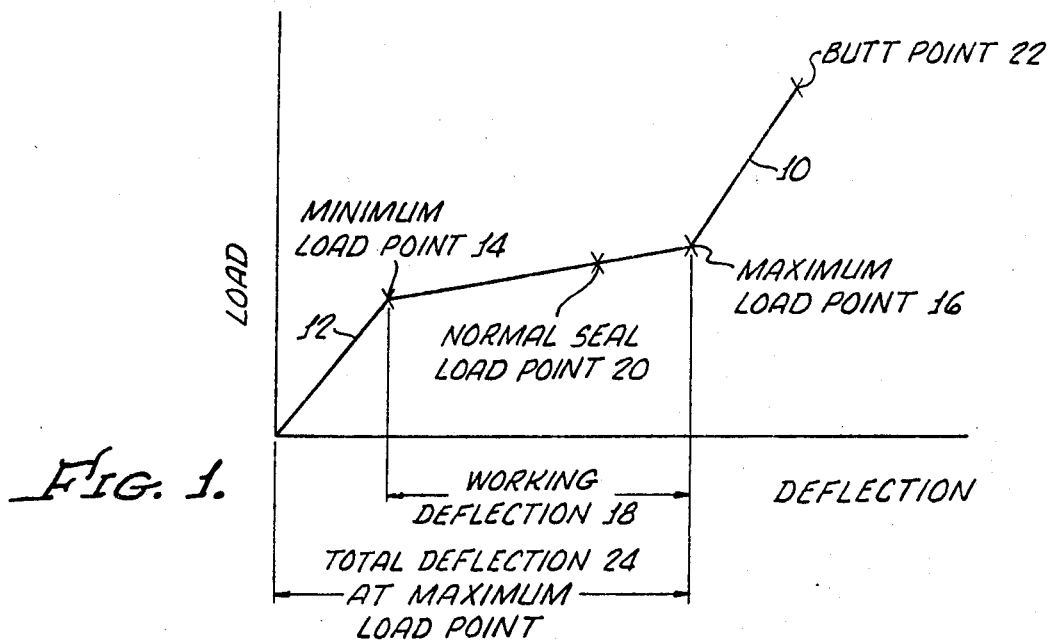
FIG. 1 is a theoretical load versus deflection curve illustrating the various parameters of a resilient coil spring in accordance with the present invention.

Turning now to FIG. 1 there is shown an exemplary load-deflection curve 10 for the purpose of illustrating the characteristics of canted coil resilient coil springs suitable for use in accordance with the present invention with a second spring as later described herein.

As shown in FIG. 1 when a load is applied to the spring, the spring deflects in a generally linear fashion as shown by the line segment 12 until it reaches a minimum of load point 14 which represents the point at which, after the initial deflection, the load begins to remain relatively constant. It is to be appreciated that for an axially resilient garter-type spring, hereinafter described, the load is applied axially and for a radially resilient garter-type spring, hereinafter described, the load is radially applied.

Between the minimum load point 14 and a maximum load point 16, the load deflection curve may be constant or show a slight increase as shown in FIG. 1. The area between the minimum load point 14 and maximum load point 16 is known as the working deflection range 18. The spring is normally loaded for operation within this range, as indicated by point 20, for a typical spring utilized in conjunction with a seal, gasket, or the like, for sealing. Loading of the spring beyond the maximum load point 16 results in an abrupt deflection response until it reaches a butt point 22, which results in a permanent set in the spring as a result of overloading. Also indicated in FIG. 1, is the total deflection range 24, which is defined as the deflection between the unloaded spring and the deflection at the maximum load point 16.

Figure 2A:
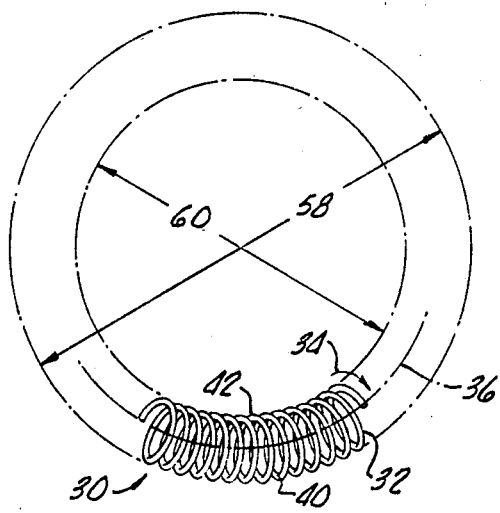
FIGS. 2a and b are plan and side views, respectively, of a circular welded clockwise wound spring with a back angle defining a trailing portion along the outside diameter of the spring and a front angle defining a leading portion along the inside diameter of the spring, in accordance with the present invention.
Figure 2B:
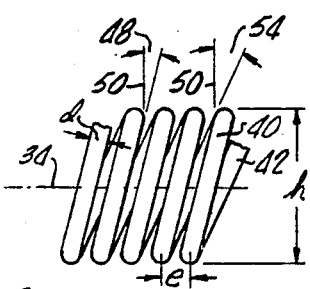

FIGS. 2a and 2b show a circular welded spring 30, in accordance with the present invention, generally showing a plurality of coils 32 wound in a clockwise fashion (see arrow 34) which are canted in a counterclockwise direction along a centerline 36 thereof.

As more clearly shown in FIG. 2b, each coil includes a trailing portion 40 and a leading portion 42, with the trailing portion having a back angle 48 which provides for means for both defining the disposition of the trailing portion 40 of each coil 32 with respect to a normal line 50 and for determining the working resilient range of the spring 30 as hereinafter described in greater detail.

In addition, a front angle 54 provides means for defining the disposition of the leading portion 42 of the coil 32 with respect to the normal line.

The spring 30 is formed by interconnecting the coils 32 in a manner forming a garter-type axially resilient coil spring with the trailing portion 40 along an outside diameter 58 (see FIG. 2a) of the spring 30 and the leading portion 42 along an inside diameter 60 of the spring 30.

As can be seen most clearly in FIG. 2b, the spring 30, in accordance with the present invention, always has a leading portion 40 disposed at a front angle 54, which is greater than the back angle 48 defining the trailing portion 40. That is, as the coil is traced in the circular-like manner about the centerline 32, each revolution includes a trailing portion and a leading portion, with the leading portion advancing movement along the centerline 32 more than the advancement along the centerline 32 when following the trailing portion 40 of the coil 32.

Figure 3A:
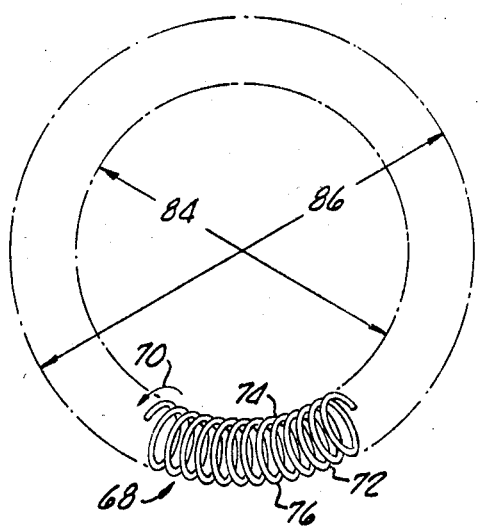
FIG. 3a and b are plan and side views, respectively, of a circular counter-clockwise wound spring having the same physical dimensions as the spring shown in FIG. 2a, 2b, also having a back angle defining a traveling portion along the outside diameter of the spring and a front angle defining a leading portion along an inside diameter of the spring.
Figure 3B:
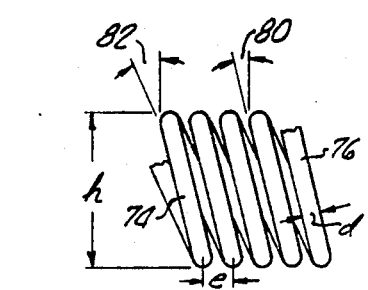

FIGS. 3a and 3b show a circular welded spring 68, in accordance with the present invention, having the same physical dimensions and wire sizes as spring 30, shown in FIGS. 2a and 2b, with the spring 68 wound in a counter-clockwise fashion (see arrow 70). In this instance, the spring 68 includes a plurality of coils 72, each having a trailing portion 74 and a leading portion 76 which are defined, respectively by a back angle 80 and a front angle 82, as shown in FIG. 3b.

Similar to spring 30, the coils 72 of spring 68 are interconnected in a manner forming a garter-type axially resilient coiled spring 68 in which the trailing portion falls along an outside diameter 86 and the leading portion falls along an inside diameter 84 of the spring 68.

Curve A of FIG. 4 represents the performance of the spring 30 or 68, while spring B represents the performance of a prior art spring identical in physical specification, but with the trailing portion along the outside of the spring. Although the two springs have almost identical force-deflection characteristics in their working deflection range, the maximum load points have a variation of about 40 percent.

It has been found that, in accordance with the present invention, the back angle can be varied from as little as one degree to 35 degrees as long as the front angle 54 is greater than the back angle and is larger than 20 degrees and less than 55 degrees. Variation in the back angle of the spring significantly affects the resilient characteristics of the spring independent of the front angle. This is shown in FIG. 5 which is a force-deflection curve for springs C and D having spring parameters set forth in Table 1. It should be appreciated that the spring parameters set forth herein are provided only to illustrate the effect of spring back angle and disposition of the trailing portion. Actual spring parameters depend upon the desired spring size, loading and application.

Springs C and D are identical springs having the same wire diameter, spring inside diameter coil height and approximately the same front angle, but the back angle and correspondingly the coil spacing is varied. As can be seen in FIG. 5, the working deflection of spring D is approximately 50 percent whereas the working deflection of spring C is 45 percent. This is independent of the front angle. Hence, springs can be designed with varying resilient characteristics, such as the force required to deflect the spring, utilizing a spring having the same wire diameter inside diameter and coil height than was heretofore possible with only varying the front angle of the spring.

TABLE 1

| Spring No. | Wire Dia.(d) (inches) | Spring I.D. (inches) | Coil Height(h) (inches) | Back Angle (degrees) | Front Angle (degrees) | Coil Spring(s) (inches) |
| --- | --- | --- | --- | --- | --- | --- |
| C | 0.022 | 0.840 | 0.161 | 10.5° | 38° | 0.043 |
| D | 0.022 | 0.840 | 0.161 | 16.25° | 38° | 0.032 |

TABLE 2

| Spring No. | Wire Dia.(d) (inches) | Spring I.D. (inches) | Coil Height(h) (inches) | Back Angle (degrees) | Front Angle (degrees) | Coil Spring(s) (inches) |
| --- | --- | --- | --- | --- | --- | --- |
| E | 0.016 | 0.850 | 0.163 | 11° | 21° | 0.016 |
| F | 0.016 | 0.850 | 0.163 | 27° | 38° | 0.016 |
| G | 0.016 | 0.850 | 0.163 | 34° | 45° | 0.016 |

As hereinabove described, increased force-deflection characteristics can be used to advantage in conjunction with a sealant, or gasket materials, wherein the spring cavity is predetermined, the latter dictating spring I.D. and coil height.

Figure 6:
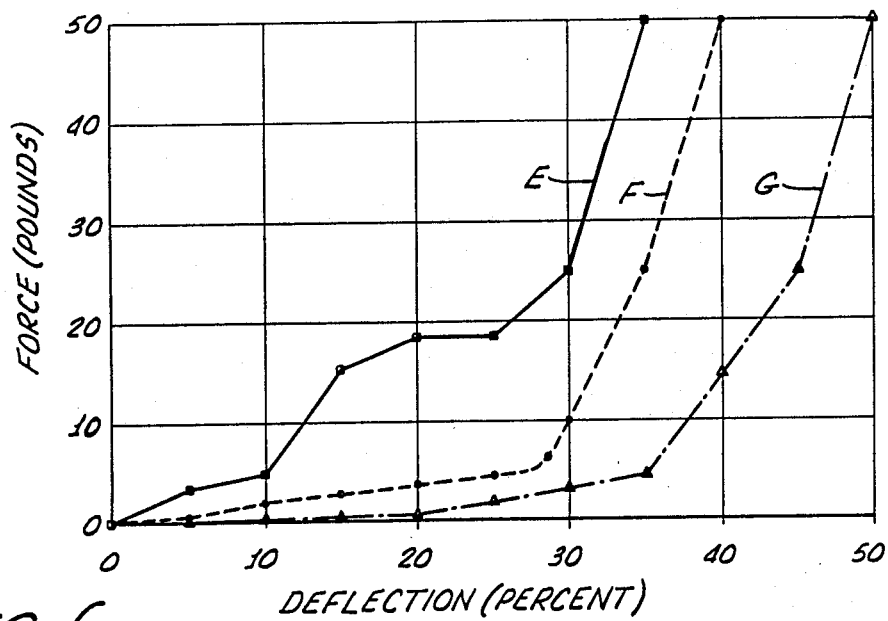
FIG. 6 shows load deflection curves for axially springs having different back angles.

When the coil spacing is held constant, the back angle along with the front angle may be varied to custom design a spring to tailor the resilient characteristics. For example, the smaller the back angle, the higher the force necessary to deflect the spring, as shown in FIG. 6, for Springs E, F and G defined in Table 2. This enables springs to be made with smaller wire and close coil spacing. Conversely, as the back angle is increased, the working deflection is increased when the coil spacing is held constant.

Figure 7A:
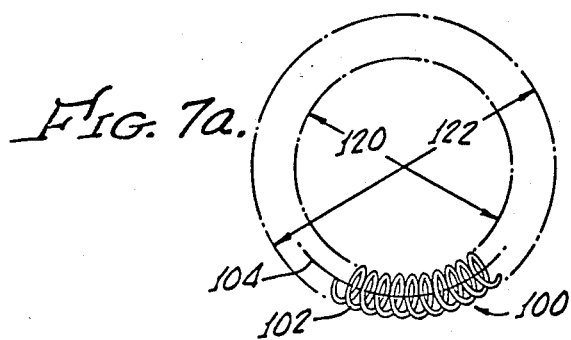
FIG. 7a and b are plan and side views, respectively, of a circular welded clockwise spring, in accordance with the present invention, with a front angle on the outside of the spring and a back angle on the inside of the spring.
Figure 7B:
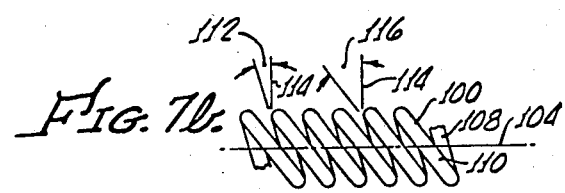

Turning now to FIG. 7a and 7b, there is shown a circular welded clockwise spring 100 in accordance with the present invention, generally showing a plurality of coils 102, which are canted in a clockwise direction along a centerline 104 thereof. As more clearly shown in 2b, each coil 102 includes a trailing portion 108 and a leading portion 110, with the trailing portion having a back angle 112 which provides for means for both defining the orientation of the trailing portion 108 of each coil 102 with respect to a normal line 114 and for determining the working resilient range of the spring 100 as hereinafter described in greater detail.

In addition, a front angle 116 provides the means for defining the orientation of the leading portion 110 of the coil 102 with respect to a normal line 114.

The spring 100 is formed by interconnecting the coils 102 in a manner forming a garter-type axially resilient coil spring with the trailing portion 108 along an inside diameter 120 (see FIG. 7a of the spring 100 and a leading portion 110 along an outside diameter 122 of the spring 100.

As can be seen most clearly in FIG. 7b, the spring 100, in accordance with the present invention, always has a leading portion 110 disposed at a front angle 116, which is greater than the back angle 112, defining the trailing portion 108. That is, as the coil is traced in the circular-like manner about the centerline 104, each revolution includes a trailing portion 108 and a leading portion 110, with the leading portion advancing movement along the centerline 104 more than the advancement along the centerline 104 when following the trailing portion 108 of the coil 102.

It should be appreciated that the inside back angle canted coil spring 100, while having the same general load/deflection characteristics as the outside back angle canted coil spring 30 hereinbefore described, the specific load/deflection characteristics of each spring are different. For example, an outside back angle canted coil spring 30 having the same wire size and dimension as an inside back angle canted coil spring 100 will generally have a higher maximum load point (See FIG. 1) than the inside back angle canted coil spring.

Figure 8:
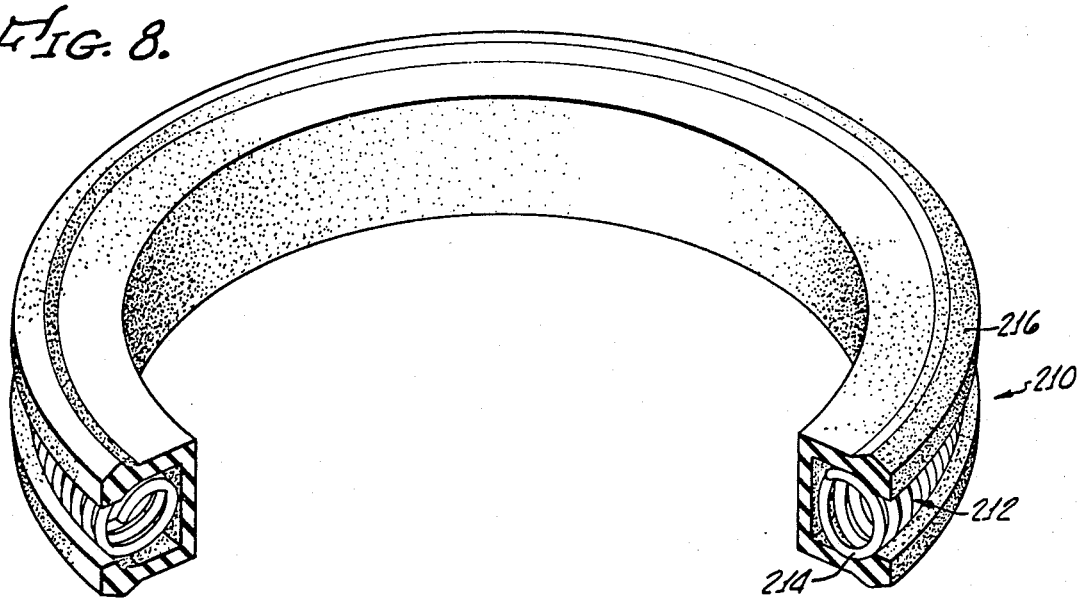
FIG. 8 is a perspective view of a single annular spring generally including an annular axially resilient coil, in accordance with the present invention, generally showing a plurality of coils interconnected in a manner forming a garter-type axially resilient coil spring, with the spring being disposed in an annular seal with a preselected turn angle orientation for controlling a resilient characteristics of the annular axially resilient coil spring, non-invasive support of the spring within the annular seal enabling independent working of the spring therein, thereby providing preselected force concentration on the sealing portions of the seal.

Turning now to FIG. 8, there is shown a garter-type axial spring 212 with a plurality of coils 214 in an annular seal 216 which provides means for non-invasively supporting the garter-type axially resilient coil spring 212, in a preselected orientation for controlling the resilient characteristics thereof, as hereinafter described in greater detail.

In FIG. 9, there is shown a load-deflection curve A, representative of the hereinbefore discussed spring 30 and 100 for comparison purposes. Also shown is a load-deflection curve B for a spring made in accordance with the present invention having a turn angle for the purpose of illustrating the characteristics thereof.

The load-deflection curve B shows the characteristics of the spring 212 made in accordance with the present invention, showing a linear load-deflection segment 236 until a peak load point 238 is reached. After the peak point 238, the load decreases with deflection in segment 240. This results in a saddle-type deflection range between the peak point 238 and the butt point 242.

This type of load-deflection characteristic may have specific advantage for spring seals which are locked in position, such as a groove, with the tension thereof being caused by the spring. In this instance, while the spring produces a relatively constant load over a given working deflection range 244, changes beyond the working range limits at points 46, 48, causes an abrupt increase in load. This causes the spring seal to be self-centering within a groove, or the like.

FIG. 10 shows a schematic form a cross-section of a canted coil spring, in accordance with the present invention, with a turn angle of $\theta$ a measured coil width of CW, a measured coil height of CH and a measured spring height H of the spring 212, as shown in FIGS. 4a, b, c and d. The turn angle may be clockwise (bold lines) or counterclockwise. (Dashed lines).

As shown in FIG. 11a, an axially flat spring 212 may be turned up counterclockwise, for example, 30 degrees, as shown in FIG. 11b, or turned clockwise, as for example, shown in FIGS. 11c and 11d, with 30 degrees and 60 degrees turn angles, respectively. It should be appreciated that while the springs shown are shown with a circular shape, other shapes are possible, such as elliptical or rectangular, depending upon the configuration of the mating parts between which the spring 212 and/or seal 216 are to be placed.

As shown in the Figures, the turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading is independent upon whether the spring is in the cone shape as shown in FIG. 11b, or an inverted cone as shown in 11c. That is the springs in 11b and 11c will perform in identical fashion.

Figure 12:
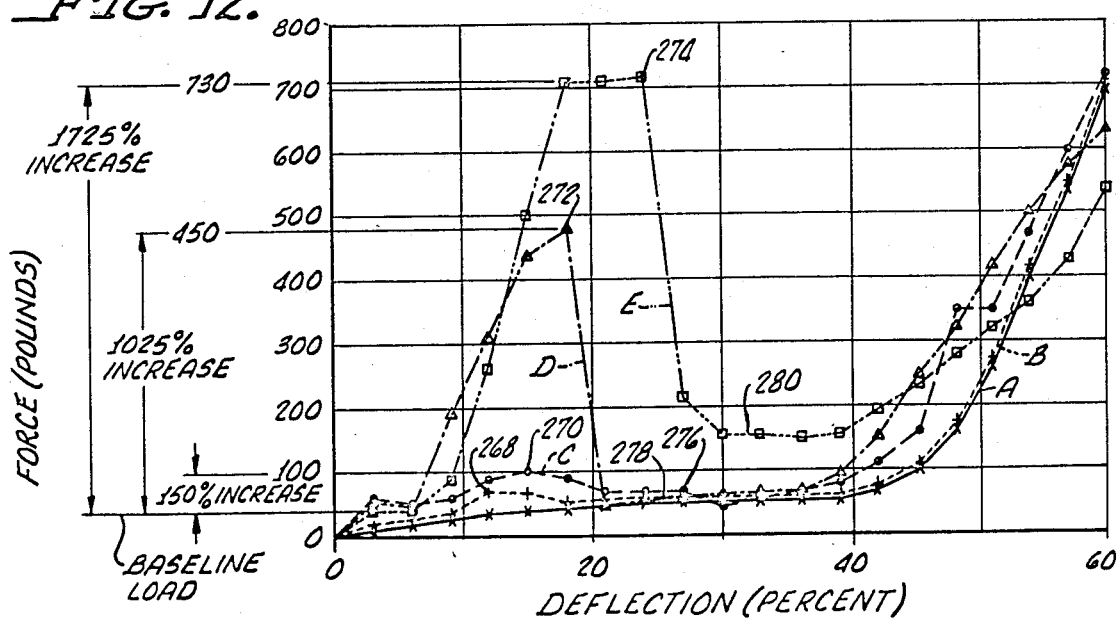
FIG. 12 is a plurality of force-deflection curves, each corresponding to an annular axially resilient coil spring having different turn angle orientation.

Curves A, B, C and D, in FIG. 12 show the force-deflection characteristics of a series of springs, with $\theta$ varied from zero degrees to 90 degrees, with a specification of these springs being set forth in Table 3. Each of the springs A, B, D, D, are identical in all respects, except for the turn angle $\theta$.

Curve A in FIG. 12 represents a spring 212 with a turn angle of zero and is representative of the springs 30 or 100. Curve B represents the spring 212 having a turn angle of 15 degrees and manifests a threshold rise 268 characteristic of springs made in accordance with the present invention. This gradual rise develops into the peak load characteristics more clearly shown by curves C, D and E, corresponding to springs C, D and E of Table 3.

As shown in FIG. 12, as the turn angle $\theta$ increases, the load increases at a maximum about 90 degrees.

of applications, as hereinabove described. As hereinbefore mentioned, although the spring shown generally are circular in shape, they could be used in other applications in irregular shapes. That is, the spring will easily fit into other shapes than round.

As shown in Table 3, the peak load is substantially greater than the base load and in fact reaches to 1725 percent when the turn angle is 90 degrees. Hence, by using a turn angle, higher load can be provided. Consequently, as hereinbefore mentioned, a smaller wire can be used which will permit the use of more coils per inch thus decreasing the stress that will occur on the seal when loaded.

Also, as hereinbefore pointed out, springs, in accordance with the present invention, exhibiting the force-deflection curves as shown buy curve C, D and E of FIG. 12, can be used in self-locking and self-centering applications not heretofore possible by springs exhibiting force-deflection curves as shown by curve A in FIG. 9.

Figure 13:
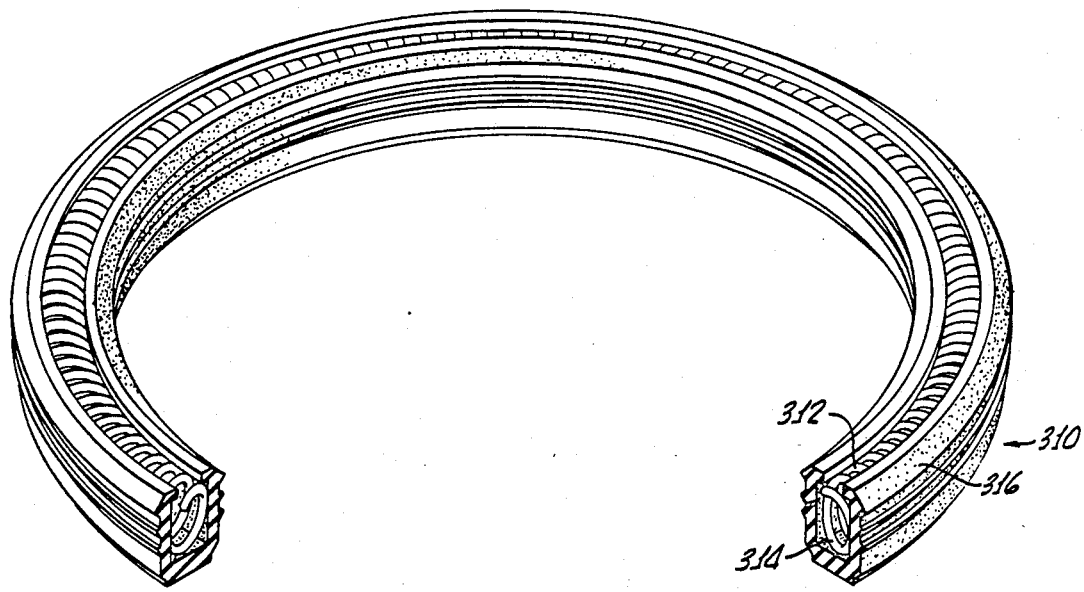
FIG. 13 is a perspective view of a radially loaded coiled spring seal, in accordance with the present invention, generally showing a plurality of coils interconnected in a manner forming a radially resilient canted coiled spring, with the spring being disposed in an annular seal with a preselected turn angle orientation for controlling the load-deflection characteristics of the radially resilient canted coiled spring, non-invasive support of the spring within the annular seal enabling independent working of the spring therein, thereby providing preselected force concentration on the sealing portions of the seal.

Turning now to FIG. 13, there is shown a spring/seal 310 including a radially radially resilient coiled spring 312, in accordance with the present invention, generally showing the radially resilient spring 312 with a plurality of coils 314 in an annular seal 316 which provides means for non-invasively supporting the garter-type radially resilient coil spring 312, in a preselected orientation for controlling the resilient characteristics thereof, as hereinafter described in greater detail.

The load-deflection curve for the spring 312 is illustrated in FIG. 1.

Figure 14:
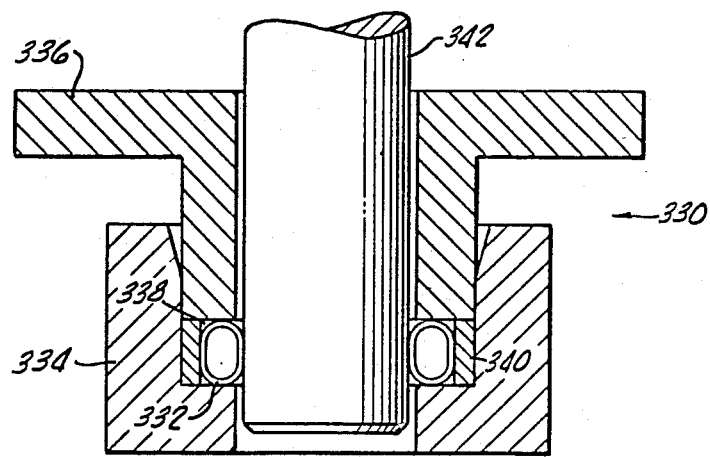
FIG. 14 shows test jig apparatus for the determination of the load deflection characteristics.

The load-deflection characteristics may be determined with a test jig 330 as shown in FIG. 14. A radially resilient spring 332 is held within a housing 334 by a fixture 336, thereby entrapping the spring 332 in a cavity 338. A circumferential spacer 340 is used to load the outside diameter of the spring 332 and the force required to pass a plug 342 through the inside diameter of the spring 332 is measured.

A radially resilient spring 312 may be turned up coun-

TABLE 3

| | Spring Height (CH) | = 0.163 in. |
|---|---|---|
| | Coil Width (CW) | = 0.180 in. |
| | Turned Height (H) | = 0.179 in. |
| | Wire Diameter (WD) | = 0.222 in. |
| | Coil Spacing | = 0.018 in. |
| | Number of Coils | = 67 |

| Spring | Turn Angle (deg.) | Peak Load Value (lbs.) | Increase Over Base Load (%) |
|---|---|---|---|
| A | 0 | NA | NA |
| B | 15 | 100 | 100% |
| C | 58 | 100 | 150% |
| D | 76 | 450 | 1025% |
| E | 90 | 730 | 1725% |

| Spring | # of Coils | Coil Height (in) | Coil Width (in) | Turned Height (in) | Wire Dia. (in) | Turn Angle (deg) | Coil Spring (in) | Trailing Portion |
|---|---|---|---|---|---|---|---|---|
| F | 67 | 0.162 | 0.179 | 0.164 | 0.022 | 32° | 0.018 | Outside diameter |
| G | 67 | 0.162 | 0.179 | 0.164 | 0.022 | 42° | 0.018 | Inside diameter | shown at 270, 272, 274, respectively, is achieved, the force decreases rapidly to approximately the forces shown by springs A and B. Thus, these springs have working regions 276, 278 and 280, approximately the same as unturned spring A; however, as can be seen in FIG. 12, these working areas are bounded by steep load-deflection characteristics. Springs, in accordance with the present invention, have advantages in a variety terclockwise, as shown in FIGS. 11a, b, c, d and e, for example, 30 degrees, as shown in FIG. 11b, or turned clockwise, as for example, shown in FIGS. 11d and 11e, with 30 degrees and 60 degrees turn angles, respectively. It should be appreciated that while the springs shown are shown with a circular shape other shapes are possible, such as elliptical or rectangular, depending upon the configuration of the mating parts between which the spring 312 and/or seal 316 are to be placed.

As shown in the Figures, the turn angle θ is defined as an angle formed by a generally circular spring forming a cone or an inverted cone, depending on the position of the spring and measuring the angle θ from the horizontal to the intersection through the centerline of each cone, or inverted cone. By varying the turn angle θ, different loads can be obtained and the degree of loading depends upon the turn angle θ. That is, the higher the turn angle θ, the higher the force developed, as will be hereinafter demonstrated. It should be noted that the force developed upon loading is independent upon whether the spring is in the cone shape as shown in FIG. 11b, or an inverted cone as shown in 11d. That is, the springs in 11b and 11d will perform in identical fashion.

The spring 312 may also have a trailing portion defined by a back angle and a leading portion defined by a front angle as hereinbefore described.

When loading the spring 312 radially, the load is greater when the turn angle is 90 degrees than when the turn angle is 0 degrees and such load increases progressively from 0 degrees to 90 degrees. In addition, a spring 312 with a back angle, or trailing portion along the inside I.D. of the spring will develop substantially higher force than a spring having a back angle or trailing portion along the outside O.D. of the spring with both springs having the same turn angle.

This enables greater tailoring ability. That is, a greater range of wire size and coil spacing can be used while still exerting the same or greater force in response to deflection.

Figure 15:
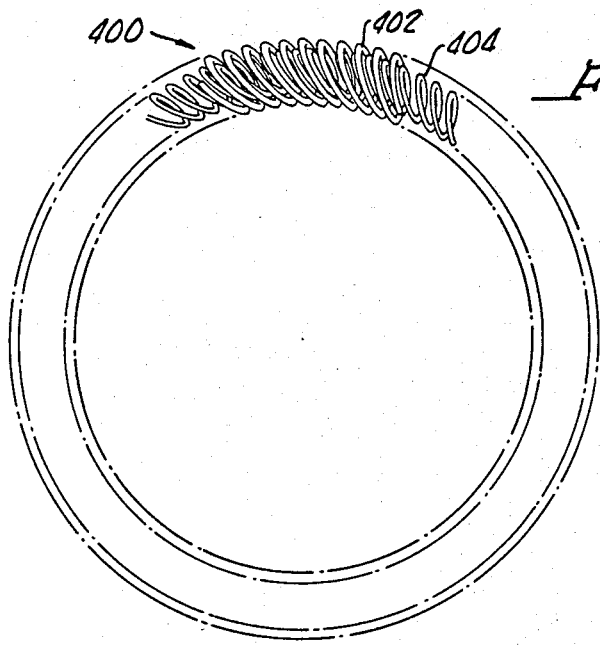
FIG. 15 is a plan view of canted coil apparatus in accordance with the present invention showing an inner and an outer coil.

With the hereinabove description of single springs, the reader's attention is now directed to FIG. 15 which illustrates in plan view form annular coil spring apparatus 400 which includes a first annular spring 402 formed in accordance with the hereinbefore provided description directed to either a radial or axial spring and an inner, second annular spring 404 disposed therein in an axial relationship. The springs 402, 404 may be formed of wire of the same diameter or of different wire diameters. For example, if the outer spring is made from a very small diameter wire and the inner spring 404 is made from a larger diameter wire, an initial lower force-deflection curve and a subsequent higher load deflection characteristic can be achieved.

As hereinbefore disclosed, the spacing of the springs may be varied in order to tailor the load force characteristics. As an example, the outer spring coils may have an entirely different spacing than the inner spring coils. If a high degree of deflection is needed, a large spacing between the coils of both springs will be made. On the other hand, if a small deflection is needed and a primary purpose is to have a more uniform number of coils on the periphery, closer spacing of the coils should be made.

It is also to be appreciated that the inside spring may be tightly fitted within the outside spring in order to provide a very high initial force upon deflection. On the other hand, if the inside spring 404 is loose inside the outer spring 402, the force developed initially will be that of the outside spring and after initial deflection, the outer spring 402 will contact the inner spring 404 and provide a higher load which will be determined in part by the direction of the canting of the coil, as hereinafter described.

In general, if the coils of the springs 402, 404 cant in the same direction, the force developed will be approximately equal to the summation of the forces of the two springs independently, but however, if the coils cant in opposite directions, the force developed will be substantially higher than when the coils cant in the same direction. It is to be appreciated that this characteristic is true of both radial springs which consist of two canted coil springs, one inside the other, each formed as hereinbefore described, or, the axial spring with one inside the other with each coil being formed as hereinbefore described.

Figure 16:
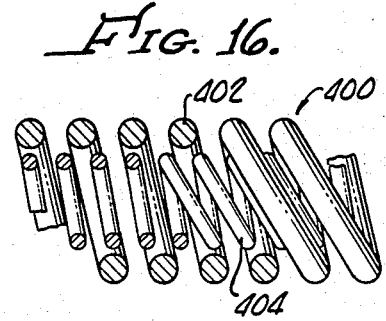
FIG. 16 is a partial cross-sectional side view of canted coil spring apparatus showing an inner and an outer coil spring canted in the same direction.
Figure 18:
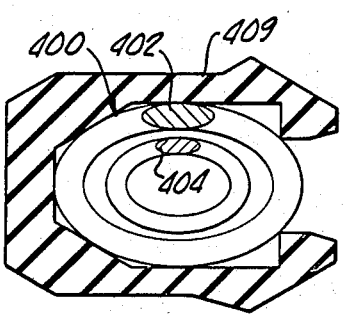
FIG. 18 is a cross-sectional view of canted coil spring apparatus in accordance with the present invention showing an inner and outer coil spring disposed within a seal.
Figure 17:
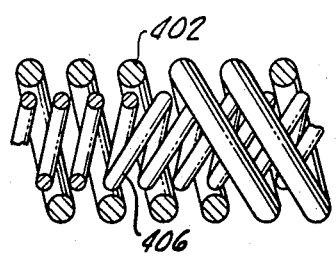
FIG. 17 is a cross-sectional view showing an inner and an outer coil having different wire sizes with the inner coil being canted in an opposite direction than an outer coil.

FIG. 16 shows the outer spring 402, 404 canted in the same direction, while in FIG. 18 the inner spring 402 surrounds an inner spring 406 which cants in an opposite direction. A cross-section of either of these configurations is shown in FIG. 17 which shows the relationship of the inner and outer springs within a typical seal 409.

Figure 20:
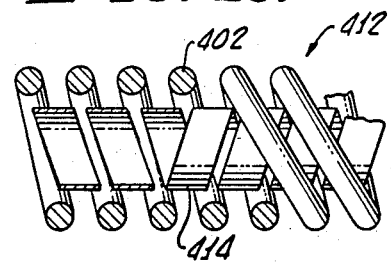
FIG. 20 is a cross-section view of the spring apparatus having an outside canted coil spring and an inner circular ribbon spring.
Figure 19:
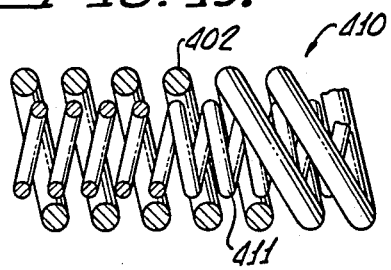
FIG. 19 shows a cross-section of the coil apparatus having a canted coil outer spring and a circular or non-canted coil inner spring.

FIG. 19 shows an alternative embodiment 410 of the present invention showing the outer spring 402 with an inner circular, a non-canted, spring 411. FIG. 20 shows an alternative embodiment 412 in accordance with the present invention including the outer canted coil spring 402 surrounding a circular ribbon, round spring 414 which may be formed from any suitable metal. While the ribbon spring 414 and circular spring 411 do not provide the same load characteristics as the canted coil spring, they may be useful in tailoring the overall load-deflection characteristics of the embodiment 10 and 412.

Figure 21:
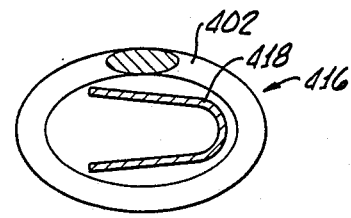
FIG. 21 shows spring apparatus in accordance with the present invention with a canted coil outer spring and an inner spring in the form of a U or V, cross-section, finger-type spring.

FIG. 21 shows a cross-section of yet another embodiment 416 in accordance with the present invention in which the outer canted coil spring 402 surrounds a V or U-shaped finger-type spring 418 formed from any suitable resilient material As with the embodiment shown in FIG. 20, the FIG. 418 may be utilized to tailor the overall load-deflection characteristics of the spring, despite the fact that it itself does not have the load-deflection characteristics of the canted coil springs in accordance with the present invention.

Figure 22:
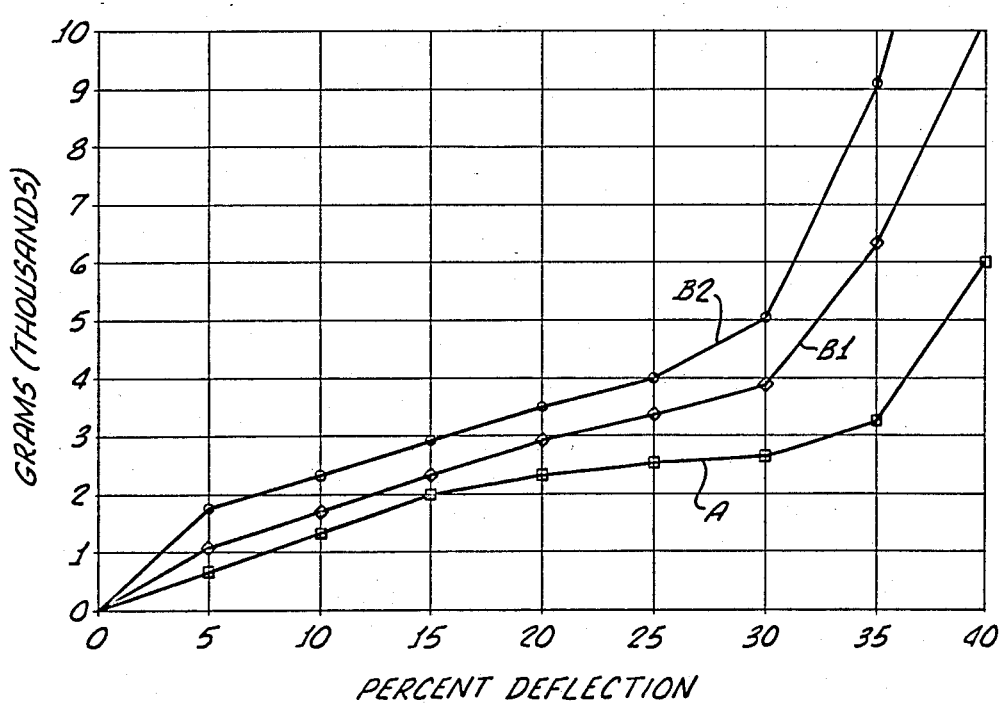

Turning now to FIG. 22, there is shown a load-deflection curve for single and dual springs, the latter formed in accordance with the present invention. Curve A in FIG. 22, shows the force versus deflection of a single outer spring having a characteristics as set forth in Table 4 and Curve B1 shows the force versus deflection of a dual coil spring with the outer coil having the characteristics of spring A and an inner spring B with the coils canted in the same direction and having characteristics as set forth in Table 4.

TABLE 4

| SPRING A | |
| --- | --- |
| Wire dia. | 0.014 inch |
| Coil height | 0.081 inch |
| Back Angle | 11.5″ |
| Spacing between coils | 0.010 inch |
| Number of coils | 46 |
| SPRING B | |
| Wire dia. | 0.008 inch |
| Coil height | 0.048 inch |
| Back Angle | 9° |
| Spacing between coils | 0.007 inch |
| Number of coils | 81 |

TABLE 5

| SPRING C | |
| --- | --- |
| Wire dia. | 0.011 inch |

TABLE 5-continued

| | |
|---|---|
| Coil height | 0.088 inch |
| Back Angle | 16.5° |
| Spacing between coils | 0.010 inch |
| Number of coils | 64 |
| SPRING D | |
| Wire dia. | 0.007 inch |
| Coil height | 0.052 inch |
| Back Angle | 13.5° |
| Spacing between coils | 0.007 inch |
| Number of coils | 83 |

Curve B2 in FIG. 22 shows the force versus deflection for a spring formed with an outer spring A and an inner spring having the characteristics as set forth as spring B in Table 4 except that the spring B is canted in an opposite direction from that of spring A. It can be readily ascertained from an examination of the curves that the spring combination having both an inner and outer canted in the same direction develops a force which is approximately 32.5 percent greater than a single spring. However, unexpectedly, utilizing the same size springs as set forth in Table 4 but with the springs canted in opposite directions, the combination develops a force which is approximately 58.6 higher than a single spring. Thus, unexpectedly, a substantially greater force is developed by inserting one spring inside another with each of the springs canting in a different direction along the coinciding centerlines thereof.

Figure 23:
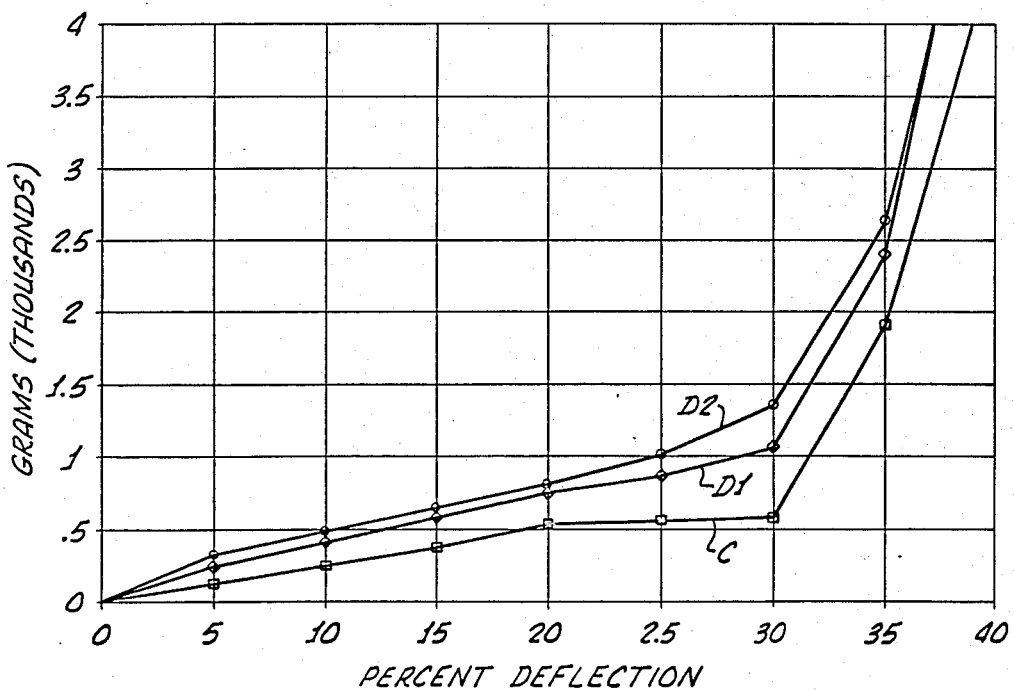
FIGS. 22 and 23 show force-deflection curves for spring apparatus in accordance with the present invention as compared to single coil springs.

Another example of this unexpected result is shown in FIG. 23 in which a force-deflection curve is shown for a spring C and a combination of springs C and D illustrated by curves D1 and D2 with the characteristics of the outer spring C and the inner spring D being set forth in Table 5.

As can be seen, the force versus deflection curve for the combination of springs in which the cant of the springs is in opposite direction, curve D2 is greater than the force-deflection curve for the combination of springs in which the cant is in the same direction, D1, both, of course, being greater than the single coil alone illustrated by curve C.

It should be appreciated that significant advantage can be derived by combining two springs as hereinabove set forth since a higher force versus deflection can be obtained within the same envelope or package than can a single spring.

Although there has been hereinabove described a specific annular coil spring apparatus in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. Annular coiled spring apparatus comprising:
(a) a first annular spring comprising:
 a plurality of coils canted along a centerline thereof;
 back angle means for defining the disposition of a trailing portion of each coil with respect to a line normal to the centerline thereof and determining the force-deflection characteristics of the first annular spring;
 front angle means for defining the disposition of a leading portion of each coil with respect to the normal line, said front angle means being greater than said back angle means;
 said coils being interconnected in a manner forming a garter-type resilient coiled spring;
(b) a second annular spring disposed within said first annular spring comprising:
 a plurality of coils canted along a centerline thereof;
 back angle means for defining the disposition of a trailing portion of each coil with respect to a line normal to the centerline thereof and determining the force-deflection characteristics of the second annular spring;
 front angle means for defining the disposition of a leading portion of each coil with respect to the normal line, said front angle means being greater than said back angle means;
 said coils being interconnected in a manner forming a second garter-type resilient coiled spring; and
 said centerline of first and second annular spring coinciding and the plurality of coils of the first annular spring canting in an opposite direction along the centerline than the plurality of coils of the second annular spring.

2. The annular coiled spring apparatus according to claim 1 wherein said coils of the first annular spring are interconnected in a manner forming a garter-type radially resilient coiled spring with the trailing portion along an outside diameter of the garter-type radially resilient coiled spring and the leading portion along an inside diameter of the garter-type radially resilient coiled spring.

3. The annular coiled spring apparatus according to claim 1 wherein said coils of the first annular spring are interconnected in a manner forming a garter-type radially resilient coiled spring with the trailing portion along an inside diameter of the garter-type radially resilient coiled spring and the leading portion along an outside diameter of the garter-type radially resilient coiled spring.

4. The annular coiled spring apparatus according to claim 1 wherein said coils of the first annular spring are interconnected in a manner forming a garter-type axially resilient coiled spring with the trailing portion along an outside diameter of the garter-type axially resilient coiled spring and the leading portion along an inside diameter of the garter-type axially resilient coiled spring.

5. The annular coiled spring apparatus according to claim 4 wherein the front angle of the first annular spring is less than 35 degrees.

6. The annular coiled spring apparatus according to claim 5 wherein the plurality of coils of the first annular spring are canted in a clockwise direction.

7. The annular coiled spring apparatus according to claim 5 wherein the back angle of the first annular spring is greater than one degree and less than 35 degrees.

8. The annular coiled spring apparatus according to claim 7 wherein the back angle means of the first annular spring defines a working deflection in which the garter-type axially resilient coiled spring exerts a generally constant force in an axial direction in response to deflection of the garter-type axially resilient coiled spring in the axially direction, said working deflection being between about 5 percent and about 50 percent deflection of the garter-type axially resilient coiled spring.

9. The annular coiled spring apparatus according to claim 5 wherein the back angle of the first annular spring is less than about 11 degrees.

10. The annular coiled spring apparatus according to claim 1 wherein said coils of the first annular spring are interconnected in a manner forming a garter-type axially resilient coiled spring with the trailing portion along an inside diameter of the garter-type axially resilient coiled spring and the leading portion along an outside diameter of the garter-type axially resilient coiled spring.

11. The annular coiled spring apparatus according to claim 5 wherein the plurality of coils of the first annular spring are canted in a counter-clockwise direction.

12. The annular coiled spring apparatus according to claim 5 wherein the back angle of the first annular spring is greater than one degree and less than 40 degrees and the front angle is greater than 15 degrees and less than 55 degrees.

13. The annular coiled spring apparatus according to claim 12 wherein the back angle means of the first annular spring defines a working deflection in which the garter-type axially resilient coiled spring exerts a generally constant force in an axial direction in response to deflection of the garter-type axially resilient coiled spring in the axial direction, said working deflection being between about 5 percent and about 50 percent deflection of the garter-type axially resilient coiled spring.

14. The annular coiled spring apparatus according to claim 5 wherein the back angle of the first annular spring is less than 25 degrees.

15. The annular coiled spring apparatus according to claim 1 or 5 wherein the front angle of the first annular spring is less than 35 degrees.

16. The annular coiled spring apparatus according to claim 1 wherein the trailing portion of the first annular spring is disposed along an outside diameter of the radially loaded canted coiled spring and the leading portion is disposed along an inside diameter of the radially resilient canted coiled spring.

17. The annular coiled spring apparatus according to claim 16 where the turn angle is about 30 degrees.

18. The annular coiled spring apparatus according to claim 16 wherein the turn angle is about 60 degrees.

19. The annular coiled spring seal apparatus comprising:

(a) a first annular axially resilient coiled spring comprising:
a plurality of coils canted along a centerline thereof;
back angle means for both defining the disposition of a trailing portion of each coil with respect to a line normal to the centerline and for determining the load-deflection characteristics of the axially resilient coiled spring;
front angle means for defining the disposition of a leading portion of each coil with respect to the normal line, said front angle means being greater than said back angle means;
said coils being interconnected in a manner forming a garter-type axially resilient coiled spring;

(b) a second annular spring disposed within said first annular spring; said second annular spring comprising:
a plurality of coils canted along a centerline thereof;
back angle means for both defining the disposition of a trailing portion of each coil with respect to a line normal to the centerline and for determining the load-deflection characteristics of the second annular spring; and
front angle means for defining the disposition of a leading portion of each coil with respect to the normal line, said front angle means being greater than said back angle means;
said coils being interconnected in a manner forming a second garter-type axially resilient coiled spring;
said first and second annular spring having coinciding centerline and the plurality of coils of the first annular spring cant in an opposite direction along the centerline than the plurality of coils of the second annular spring; and (c) annular seal means for non-invasively supporting the first annular axially resilient coiled spring in a preselected orientation for controlling the resilient characteristics of the first annular axially resilient coiled spring.

20. The annular coiled spring seal apparatus according to claim 19 wherein said annular seal means includes means defining a cavity for supporting and orienting said first annular axially resilient coiled spring with a turn angle of greater than zero degrees and less than 90 degrees.

21. The annular coiled spring apparatus according to claim 20 wherein the turn angle is selected to provide the first annular axially resilient coiled spring with a saddle shaped load-deflection characteristic.

22. The annular coiled spring seal apparatus according to claim 21 wherein the turn angle is greater than about 15 degrees.

23. The annular coiled spring seal apparatus according to claim 22 wherein the turn angle is greater than about 60 degrees.

24. The annular coiled spring seal apparatus according to claim 21 wherein the trailing portion of the first annular spring is disposed along an outside diameter of the garter-type axially resilient coiled spring and the leading portion is disposed along an inside diameter of the garter-type axially resilient coiled spring.

25. The annular coiled spring seal apparatus according to claim 21 wherein the trailing portion of the first annular spring is disposed along an inside diameter of the garter-type axially resilient coiled spring an the leading portion is disposed along an outside diameter of the garter-type axially resilient coiled spring.

26. The annular coiled spring seal apparatus according to claim 25 wherein the back angle means of the first annular spring is between one degree and 45 degrees.

27. The annular coiled spring seal apparatus according to claim 26 wherein the front angle means of the first annular spring is less than 35 degrees.

28. The annular coiled spring apparatus comprising:
(a) a first annular radially resilient canted coiled spring comprising:
a plurality of coils canted along a center, line thereof;
back angle means for defining the disposition of a trailing portion of each coil with respect to a line normal to the centerline;
front angle means for defining the disposition of a leading portion of each coil with respect to the normal line, said front angle means being greater than said back angle means;
means orienting said plurality of coils at a turn angle for defining the load-deflection characteristics of the radially resilient canted coiled spring, said turn angle being greater than zero degrees and less than 90 degrees; and (b) a second annular spring disposed within said first annular spring comprising:
  a plurality of coils canted along a centerline thereof;
  back angle means for defining the disposition of a trailing portion of each coil with respect to a line normal to the centerline;
  front angle means for defining the disposition of a leading portion of each coil with respect to the normal line, said front angle means being greater than said back angle means;
  said first and second annular springs having coinciding centerlines and the plurality of coils of the first annular spring cant in an opposite direction along the centerline than the plurality of coils of the second annular spring.

29. The annular coiled spring apparatus according to claim 28 wherein the trailing portion of the first annular spring is disposed along an inside diameter of the radially loaded canted coiled spring and the leading portion is disposed along an outside diameter of the radially resilient canted coiled spring.

30. The Annular coiled spring apparatus according to claim 29 wherein the back angle of the first annular spring is about 4 degrees.

31. The annular coiled spring apparatus according to claim 30 wherein the front angle of the first annular spring means is less than about 55 degrees.

32. The annular coiled spring apparatus according to claim 31 wherein the first radially resilient canted coiled spring is disposed in a seal at a preselected turn angle.

* * * * *